US012440856B2

(12) United States Patent
Liu et al.

(10) Patent No.: US 12,440,856 B2
(45) Date of Patent: Oct. 14, 2025

(54) SMALL-SIZE AXIAL POWDER FEEDING INNER HOLE PLASMA SPRAYING GUN

(71) Applicant: Army Academy of Armored Forces, Beijing (CN)

(72) Inventors: Ming Liu, Beijing (CN); Haidou Wang, Beijing (CN); Guozheng Ma, Beijing (CN); Zhiguo Xing, Beijing (CN); Yanfei Huang, Beijing (CN); Weiling Guo, Beijing (CN); Xinyuan Zhou, Beijing (CN); Lihong Dong, Beijing (CN); Yuelan Di, Beijing (CN); Dongyu He, Beijing (CN)

(73) Assignee: Army Academy of Armored Forces, Beijing (CN)

( * ) Notice: Subject to any disclaimer, the term of this patent is extended or adjusted under 35 U.S.C. 154(b) by 703 days.

(21) Appl. No.: 17/894,656

(22) Filed: Aug. 24, 2022

(65) Prior Publication Data

US 2024/0042469 A1 Feb. 8, 2024

(30) Foreign Application Priority Data

Aug. 8, 2022 (CN) ........................ 202210944611.6

(51) Int. Cl.
*B05B 7/22* (2006.01)

(52) U.S. Cl.
CPC .................................... *B05B 7/226* (2013.01)

(58) Field of Classification Search
CPC ...................................................... B05B 7/226
See application file for complete search history.

(56) References Cited

U.S. PATENT DOCUMENTS 3,740,522 A * 6/1973 Muehlberger ........... H05H 1/42 219/121.52
5,019,429 A * 5/1991 Moskowitz ............. C23C 4/129 427/455
5,298,835 A * 3/1994 Muehlberger ........... H05H 1/44 315/111.21

(Continued)

FOREIGN PATENT DOCUMENTS

CA 2207878 A1 * 12/1997 .............. F28F 19/02
CN 1448223 A 10/2003
CN 1175940 C * 11/2004

(Continued)

OTHER PUBLICATIONS

CN_1175940_C translation (Year: 2004).*

*Primary Examiner* — Woody A Lee, Jr.

(57) ABSTRACT

A small-size axial powder feeding inner hole plasma spraying gun comprises a nozzle with one end fixed on one side of a front gun body through a nozzle gland and the other end extending to the other side of the front gun body; an insulator arranged between the front gun body and a rear gun body; a powder feeding frame fixedly connected to the rear gun body internally provided with a powder inlet channel, a cathode seat of a cathode being connected to the powder feeding joint, a cathode head extending into a spray hole channel of the nozzle, and an annular cavity being formed between the cathode head and an inner wall of the spray hole channel; an air inlet channel arranged on the front gun body and communicated with the annular cavity; and a cooling channel with an interior introduced with cooling water.

10 Claims, 14 Drawing Sheets

(56) References Cited

U.S. PATENT DOCUMENTS

| | | | | |
|---|---|---|---|---|
| 10,858,296 | B1 * | 12/2020 | Myrick | C06B 45/04 |
| 2024/0367139 | A1 * | 11/2024 | Wrobel | H05H 1/4622 |

FOREIGN PATENT DOCUMENTS

| | | | | | |
|---|---|---|---|---|---|
| CN | 104349566 | A | | 2/2015 | |
| CN | 205430749 | U | * | 8/2016 | |
| CN | 220537892 | U | * | 2/2024 | |
| CN | 119346338 | A | * | 1/2025 | B05D 3/142 |

* cited by examiner

SMALL-SIZE AXIAL POWDER FEEDING INNER HOLE PLASMA SPRAYING GUN

CROSS REFERENCE TO RELATED APPLICATIONS

This application claims foreign priority of Chinese Patent Application No. 202210944611.6, filed on Aug. 8, 2022 in the China National Intellectual Property Administration, the disclosures of all of which are hereby incorporated by reference.

TECHNICAL FIELD

The present invention belongs to the technical filed of plasma spraying guns, and more particularly, relates to a small-size axial powder feeding inner hole plasma spraying gun.

BACKGROUND

Cylinder, hole, ring, pipe and other inner hole parts are key parts of power, transmission, manipulation and transportation systems in mechanical equipment, and are also short service life parts subjected to extremely harsh service conditions and prone to various damages and failures. The research and development of a coating technology for strengthening/modification/life prolongation of inner wall surfaces of equipment parts is an important way to improve a service reliability of equipment, prolong a service life of equipment, and reduce operation and maintenance costs of whole life cycle of equipment.

For example, an internal combustion engine is used in automobile industry, aerospace industry, shipbuilding industry and machinery industry, and is one of the most critical parts. However, a reciprocating motion of a piston causes fatigue wear on a surface of the piston, thus reducing a service life of a cylinder liner of the internal combustion engine. Experiments have proved that the wear resistance of a cylinder block can be improved by spraying a layer of wear-resistant coating on an inner wall of an air cylinder. For another example, in order to improve the corrosion resistance of a petroleum pipeline, it is necessary to spray a corrosion-resistant coating on an inner surface of the petroleum pipeline, and in order to improve the wear resistance of a coupling of the petroleum pipeline, it is necessary to spray a wear-resistant and anti-adhesion coating on an inner surface of the coupling.

A method for preparing a thermal spraying coating on a surface of an inner hole comprises flame spraying, electric arc spraying and plasma spraying. The flame spraying and the electric arc spraying have a long spraying distance, few sprayable material types and a low coating performance. The plasma spraying has a coating performance better than those of the flame spraying and the electric arc spraying, and a small spraying distance, thus being easy to realize coating spraying on an inner surface of a small hole channel.

In reality, some pipelines, couplings and engine cylinder blocks are small in size and belong to semi-blind holes or blind holes, so that a special inner hole plasma spraying gun is needed for spraying an inner wall and a hole bottom. The smaller the inner diameter of the hole is, the smaller the spraying gun capable of being used for spraying a coating on the inner wall is. In the prior art, when a size of the spraying gun is reduced, a maximum power capable of being reached is reduced, which is not conducive to spraying a metal or ceramic coating with a high melting point and good wear resistance. Moreover, most small-size inner hole spraying guns adopt an external powder feeding method, which is more unfavorable to the melting and acceleration of a sprayed material, thus being not easy to obtain a high-performance coating in the inner hole. Even though some inner hole spraying guns adopt an internal powder feeding method, since a powder feeding position is not in a high temperature zone of a plasma flame flow, energy utilization is insufficient, the spraying distance is too small, and a flying time of the powder in a jet flow is too short, there are defects of insufficient powder melting, low powder utilization rate, low spraying efficiency and serious dust pollution in the coating.

Existing inner hole plasma spraying guns mainly have the following problems:

(1) A gun body thickness of the spraying gun is too large. The gun body thickness of the spraying gun is great than or equal to 40 mm (the gun body thickness of the spraying gun refers to a distance between a front edge of a gun body in a direction of a jet flow outlet and a rear edge of a tail portion of the gun body), and a thickness of a common spraying gun ranges from 60 mm to 70 mm. The smaller the thickness of the spraying gun is, the smaller the diameter of the sprayable inner hole is.

(2) Spraying gun without axial powder feeding inner hole. Most of the spraying guns adopt the external powder feeding method, with a low plasma flame temperature at the powder feeding position, which is unfavorable to the melting and acceleration of the sprayed material, thus being not easy to obtain a high-performance coating in the inner hole. Even though some inner hole spraying guns adopt the internal powder feeding method, since the powder feeding position is not in the high temperature zone of the plasma flame flow, the energy utilization is insufficient, the spraying distance is too small, and the flying time of the powder in the jet flow is too short, there are defects of insufficient powder melting, low powder utilization rate, low spraying efficiency and serious dust pollution in the coating.

(3) When an inner wall of a hole with an inner diameter less than Φ175 mm is sprayed, only the small-size inner hole spraying gun can be used, and the power of the small-size inner hole spraying gun cannot reach more than 35 kW. The larger the power is, the more fully the sprayed material melts, which is more conductive to obtaining a high-performance coating.

SUMMARY

Aiming at the defects of the prior art, the present invention aims to provide a small-size axial powder feeding inner hole plasma spraying gun, which adopts an axial powder feeding method, and effectively reduces a thickness of the spraying gun by reasonably setting a structure of the spraying gun, thus improving power of the spraying gun.

The present invention provides the technical solutions as follows.

A small-size axial powder feeding inner hole plasma spraying gun comprises:

- a front gun body provided with a first through hole;
- a nozzle with one end fixed on one side of the front gun body through a nozzle gland and the other end penetrating through the first hole to extend to the other side of the front gun body,
- wherein a spray hole channel is coaxially arranged in the nozzle;

a rear gun body;

an insulator arranged between the front gun body and the rear gun body, and fixedly connected with the front gun body and the rear gun body at the same time, wherein the insulator is provided with a second through hole, and the rear gun body is provided with a third through hole; and the first through hole, the second through hole and the third through hole are coaxially arranged;

a powder feeding frame fixedly connected to the rear gun body, wherein an interior of the powder feeding frame is provided with a powder inlet channel, and one side of the powder feeding frame close to the rear gun body is provided with a powder feeding joint; and the powder inlet channel is communicated with a channel of the powder feeding joint;

a cathode arranged in the second through hole and the third through hole at the same time, wherein a cathode seat of the cathode is connected to the powder feeding joint, a cathode head penetrates through the second through hole to extend into the spray hole channel of the nozzle, and an annular cavity is formed between the cathode head and an inner wall of the spray hole channel; and a powder feeding hole channel is coaxially arranged in the cathode, one end of the powder feeding hole channel is communicated with the channel of the powder feeding joint, and the other end of the powder feeding hole channel is communicated with the spray hole channel; and the powder feeding hole channel is coaxially arranged with the spray hole channel;

an air inlet channel arranged on the front gun body and communicated with the annular cavity; and a cooling channel with an interior introduced with cooling water, so that the cooling water enters through the front gun body, flows through an outside area of the nozzle and an outside area of the cathode in a surrounding manner in sequence, and then flows out from the rear gun body, wherein an outside of the cathode is provided with an annular radiating fin at the corresponding cooling channel.

Preferably, the cooling channel comprises a water inlet channel, a first annular water cavity, a water passing channel, a second annular water cavity and a water outlet channel which are communicated in sequence;

the water inlet channel is arranged in the front gun body; the first annular water cavity is arranged in the front gun body and arranged around an outer wall of the nozzle;

the second annular water cavity is arranged in the rear gun body, and the annular radiating fin is located in the second annular water cavity;

the water passing channel penetrates through the insulator to communicate the first annular water cavity with the second annular water cavity; and the water outlet channel is arranged in the rear gun body.

Preferably, the spray hole channel comprises a compression section, a throat and an expansion section in sequence in an axial direction; and a tail end of the expansion section is an outlet of the nozzle; and the annular cavity is formed between the cathode head and an inner wall of the compression section. Preferably, an outer wall of the nozzle is coaxially provided with an annular cooling groove, and an opening of the cooling groove faces an outlet end of the nozzle and is communicated with the first annular water cavity.

Preferably, the insulator is provided with an annular air inlet groove on one side facing the front gun body, and the air inlet groove is communicated with the air inlet channel and arranged around the second through hole;

an annular bulge is coaxially and fixedly arranged in the air inlet groove, and the bulge divides the air inlet groove into a first annular groove and a second annular groove which are concentrically arranged;

the bulge is provided with a plurality of guide air grooves, and the guide air grooves communicate the first annular groove with the second annular groove; and the second annular groove is communicated with the annular cavity.

Preferably, the air guide grooves are arranged in a radial direction of the annular bulge.

Preferably, an included angle is formed between an axial direction of the guide air grooves and a radial direction of the annular bulge, so that gas entering from the guide air grooves deviates from a center of the second annular groove.

Preferably, the insulator is connected with the front gun body and the rear gun body at the same time through a gun body fixing bolt;

an insulating gasket is embedded in the front gun body, and the insulating gasket is sleeved on a screw of the gun body fixing bolt and abuts against the insulator; and an insulating bushing is embedded in the rear gun body and the insulator, and the insulating bushing is sleeved on the screw and a nut of the gun body fixing bolt; and one end of the insulating bushing abuts against the insulating gasket.

Preferably, a gun body thickness of the spraying gun ranges from 28 mm to 32 mm.

Preferably, the small-size axial powder feeding inner hole plasma spraying gun further comprises determination of sizes of parts of the spraying gun according to the following formula:

$$m=\left(\frac{d_0\cdot T_0}{1000}\right)^3\cdot\rho_0^2;$$

wherein when m is less than 0.5, d1=7.5, d2=4.8 and Lw=6.5;

when m is 0.5 to 5, d1=7, d2=5 and Lw=5.8; and when m is 5 to 30, d1=6.4, d2=4.8 and Lw=5.2; and when m is 30 to 100, d1=5.2, d2=4.4 and Lw=3.8; and when m is greater than 100, d1=5, d2=4 and Lw=3.5;

wherein m is a reference value for selection, $d_0$ is a particle size of sprayed powder, in unit mm, $T_0$ is a melting point of a powder material, in unit ° C., $\rho_0$ is a density of the powder material, in unit g/cm$^3$; d1 is a diameter of the throat, d2 is a diameter of the outlet of the nozzle, and Lw is a length of the cathode head.

The present invention has the beneficial effects as follows.

(1) The small-size axial powder feeding inner hole plasma spraying gun provided by the present invention has the advantages of small size, large power and axial powder feeding.

(2) According to the small-size axial powder feeding inner hole plasma spraying gun provided by the present invention, a powder outlet of axial powder feeding is located in a high-temperature zone of a plasma arc column, energy is fully utilized, and the powder is easy to be fully heated, thus significantly increasing a powder melting ratio, improving a spraying efficiency, and reducing dust pollution.

DETAILED DESCRIPTION

Figure 1:
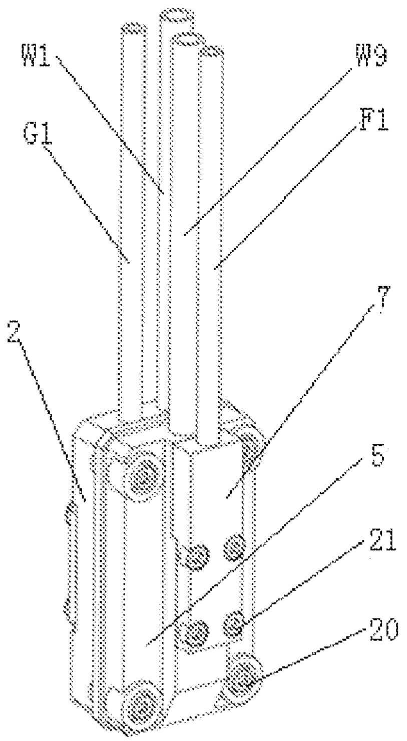
FIG. 1 is a schematic diagram of an overall structure of a small-size axial powder feeding inner hole plasma spraying gun according to the present invention.
Figure 2:
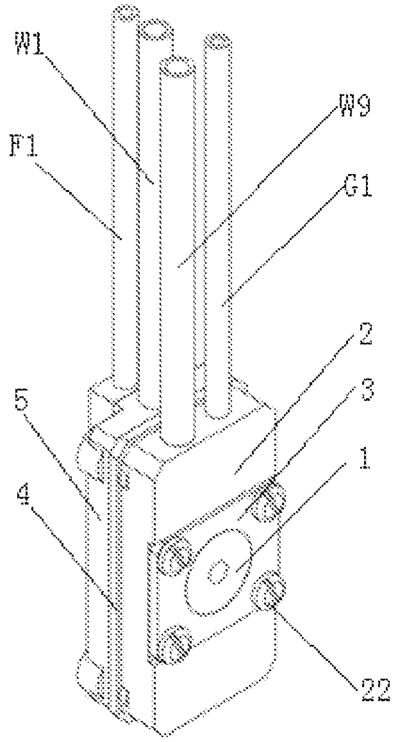
FIG. 2 is a schematic diagram of a front portion of the small-size axial powder feeding inner hole plasma spraying gun according to the present invention.
Figure 3:
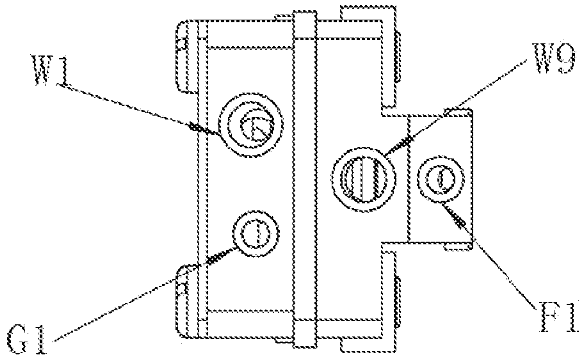
FIG. 3 is a top view of the small-size axial powder feeding inner hole plasma spraying gun according to the present invention.

The present invention is further described in detail hereinafter with reference to the drawings, so that those skilled in the art are able to implement according to the text of the specification.

As shown in FIG. 1 to FIG. 21, the present invention provides a small-size axial powder feeding inner hole plasma spraying gun, which mainly comprises a nozzle 1, a front gun body 2, a nozzle gland 3, an insulator 4, a rear gun body 5, a cathode 6 and a powder feeding frame 7.

The front gun body 2 is provided with a first through hole 2*a*. One end of the nozzle 1 is fixed on an outside of the front gun body 2 through the nozzle gland 3, and the other end of the nozzle extends to an inside of the front gun body 2 through the first through hole 2*a*, and is flush with the inside of the front gun body 2. The nozzle gland 3 is partially embedded in the front gun body 2 and connected to the front gun body 2 through a plurality of nozzle gland fixing bolts 22. A spray hole channel 1*a* is coaxially arranged in the nozzle 1. An O-shaped ring M1 and an O-shaped ring M2 are respectively arranged between a front end and a rear end of the nozzle 1 and the front gun body 2. According to the present invention, a space size of the spraying gun is reduced by designing the gland-type fixed nozzle. According to existing nozzles, a pressing cap is fixed on the front gun body through a thread, but the biggest problem of this design is that a larger size is needed in an axial direction. According to the present invention, the nozzle 1 is fixed through the nozzle gland 3, and the nozzle gland 3 does not need the design of thread. The nozzle gland 3 is fixed on the front gun body 2 through the gland fixing bolts 22 at four corners, which saves a large space in the axial direction for the nozzle 1, thus effectively reducing the thickness of the spraying gun.

The insulator 4 is arranged between the front gun body 2 and the rear gun body 5, and fixedly connected with the front gun body 2 and the rear gun body 5 at the same time. The insulator 4 is provided with a second through hole 4*a*, and the rear gun body 5 is provided with a third through hole 5*a*; and the first through hole 2*a*, the second through hole 4*a* and the third through hole 5*a* are coaxially arranged.

The powder feeding frame 7 is fixedly connected to an outside of the rear gun body 5 through a plurality of powder feeding frame fixing bolts 21. An interior of the powder feeding frame 7 is provided with a powder inlet channel 7*a*, and one side of the powder feeding frame 7 close to the rear gun body 5 is provided with a powder feeding joint 71. One end of the powder inlet channel 7*a* is communicated with a channel in the powder feeding joint 71, and the other end of the powder inlet channel is communicated with a power inlet pipe F1. An O-shaped ring M3 is arranged between the powder feeding frame 7 and the rear gun body 5, and the O-shaped ring M3 is arranged around the third through hole 5*a*.

Figure 13:
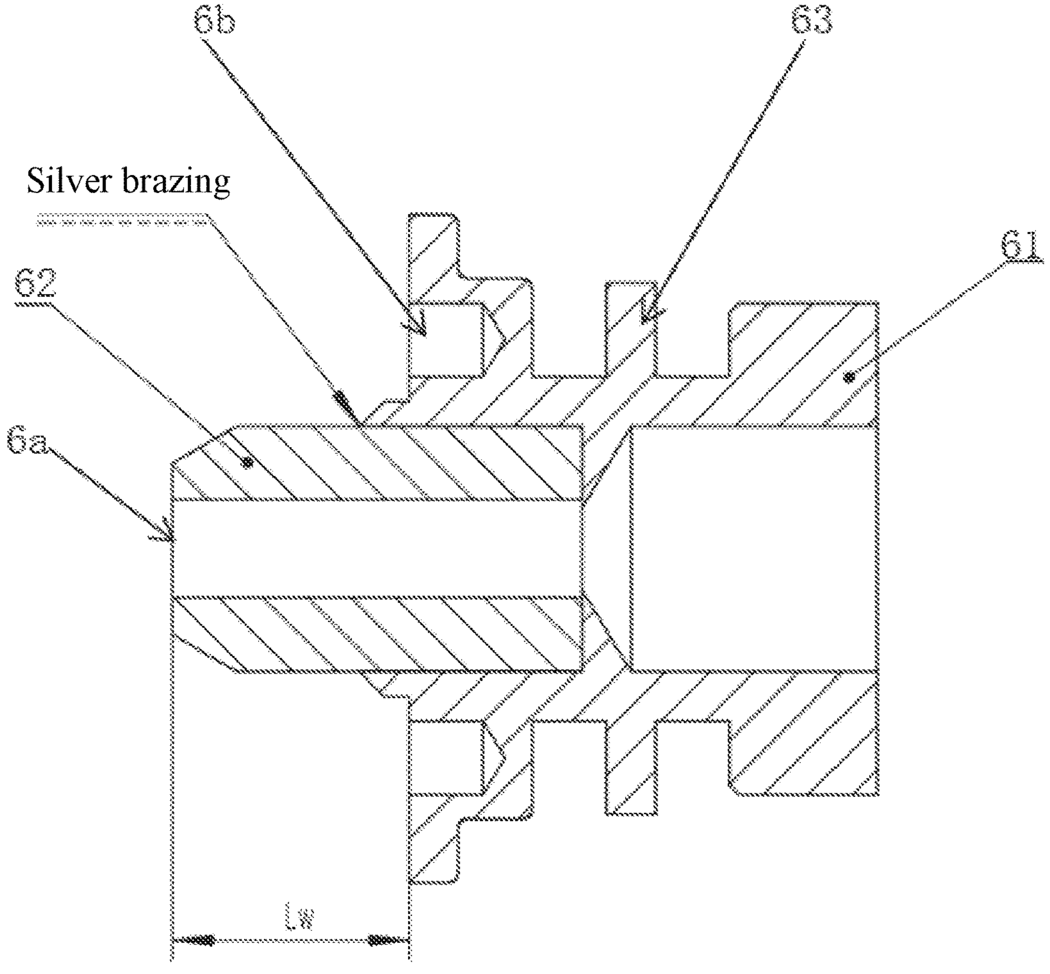
FIG. 13 is a schematic diagram of an axial section of the cathode according to the present invention.
Figure 14:
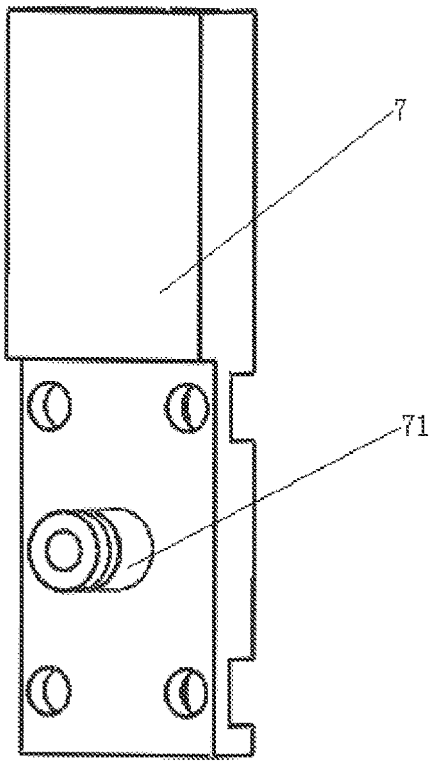
FIG. 14 is a schematic diagram of an external structure of a powder feeding frame according to the present invention.
Figure 15:
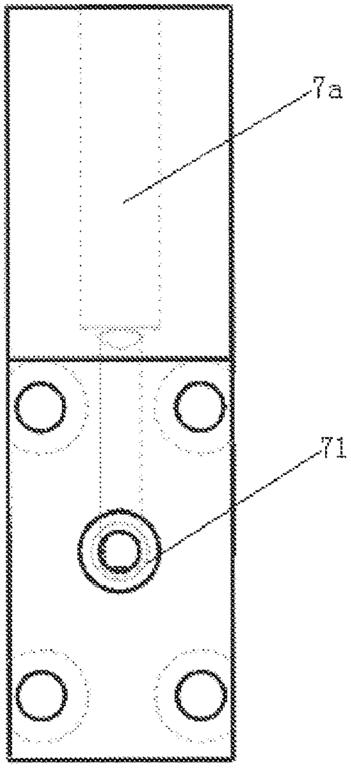
FIG. 15 is a perspective view of the powder feeding frame according to the present invention.
Figure 16:
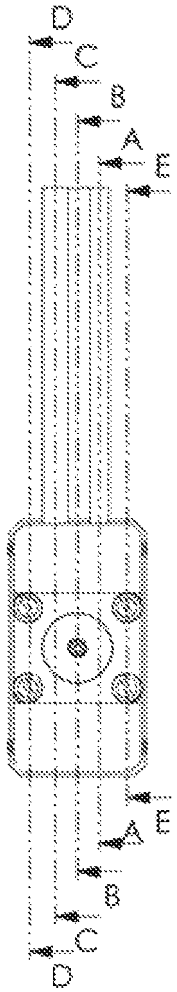
FIG. 16 is a front view of the small-size axial powder feeding inner hole plasma spraying gun according to the present invention.

The cathode 6 is arranged in the second through hole 4*a* and the third through hole 5*a* at the same time. As shown in FIG. 13, the cathode 6 comprises a cathode seat 61 and a cathode head 62. The cathode head 62 is fixed to a front end of the cathode seat 61 by silver brazing. The cathode seat 61 is connected to the powder feeding joint 71, a front end of the cathode head 62 penetrates through the second through hole 4*a* to extend into the spray hole channel 1*a* of the nozzle 1, and an annular cavity 1*b* is formed between the cathode head 62 (front end) and an inner wall of the spray hole channel 1*a*. The cathode 6 is tightly pressed on the rear gun body 5 through the powder feeding frame 7. An O-shaped ring M4 is arranged between the cathode 6 and the powder feeding joint 71, and an O-shaped ring M5 is arranged between the cathode 6 and the rear gun body 5.

A powder feeding hole channel 6*a* is coaxially arranged in the cathode 6, one end (an inlet end of the cathode seat 61) of the powder feeding hole channel 6*a* is communicated with the channel in the powder feeding joint 71, and the other end (an outlet end of the cathode head 62) of the powder feeding hole channel is communicated with the spray hole channel 1*a*. The powder feeding hole channel 6*a* is coaxially arranged with the spray hole channel 1*a*.

The spraying gun provided by the present invention adopts axial powder feeding, and a high-melting-point powder material may be sprayed in a small-size inner hole under a small spraying distance. A powder outlet for axial powder feeding in the spraying gun is the cathode head 62, where a temperature of a plasma flame is high, which can reach more than 8,000° C., thus being conducive to rapid heating and melting of the powder material.

Further preferably, the cathode 6 is provided with four mounting propelling holes 6*b*. The four mounting propelling holes 6*b* are matched with a special tool. By using the special tool on the four mounting propelling holes 6*b*, it is convenient for propelling rotation of the cathode 6, so as to fix the cathode on the powder feeding frame 7.

Figure 4:
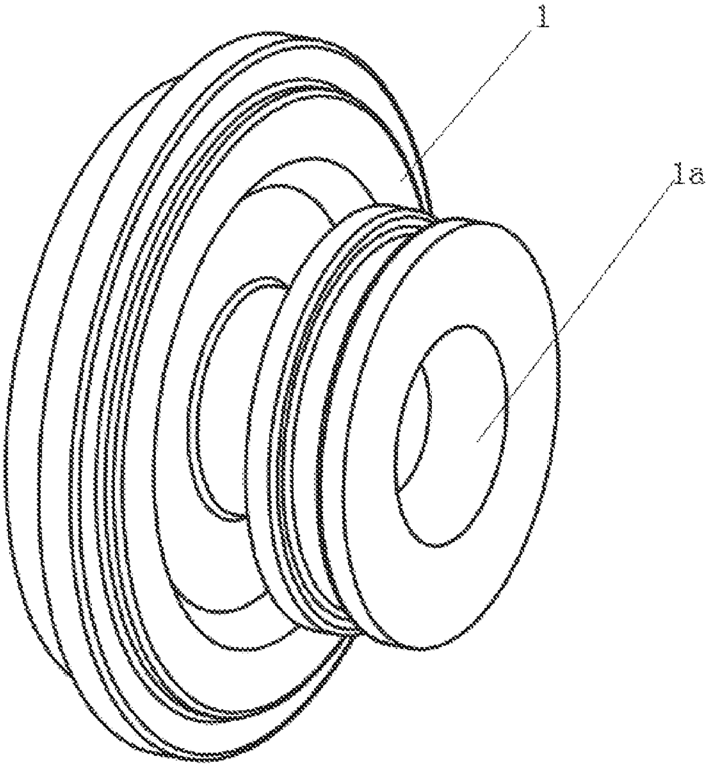
FIG. 4 is a schematic diagram of an external structure of a nozzle according to the present invention.
Figure 5:
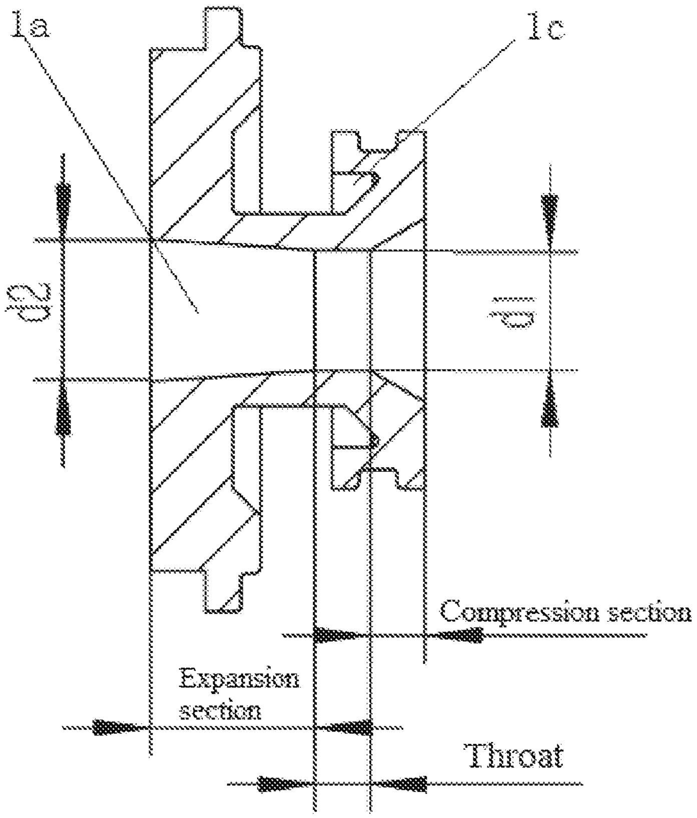
FIG. 5 is a schematic diagram of an axial section of the nozzle according to the present invention.
Figure 6:
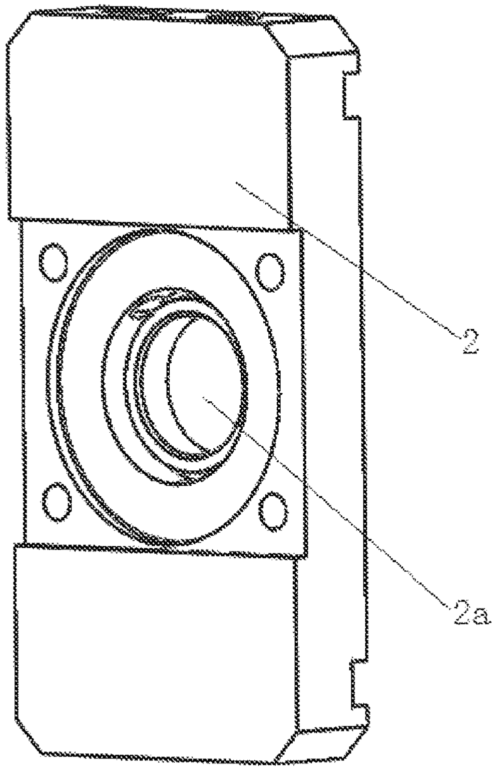
FIG. 6 is a schematic diagram of an external structure of a front gun body according to the present invention.

As shown in FIG. 4, in the embodiment, the spray hole channel 1*a* comprises a compression section, a throat and an expansion section which are communicated in sequence in a spraying direction. A tail end of the expansion section is an outlet of the nozzle 1; and the annular cavity 1*b* is formed between the cathode head 62 and an inner wall of the compression section.

Figure 7:
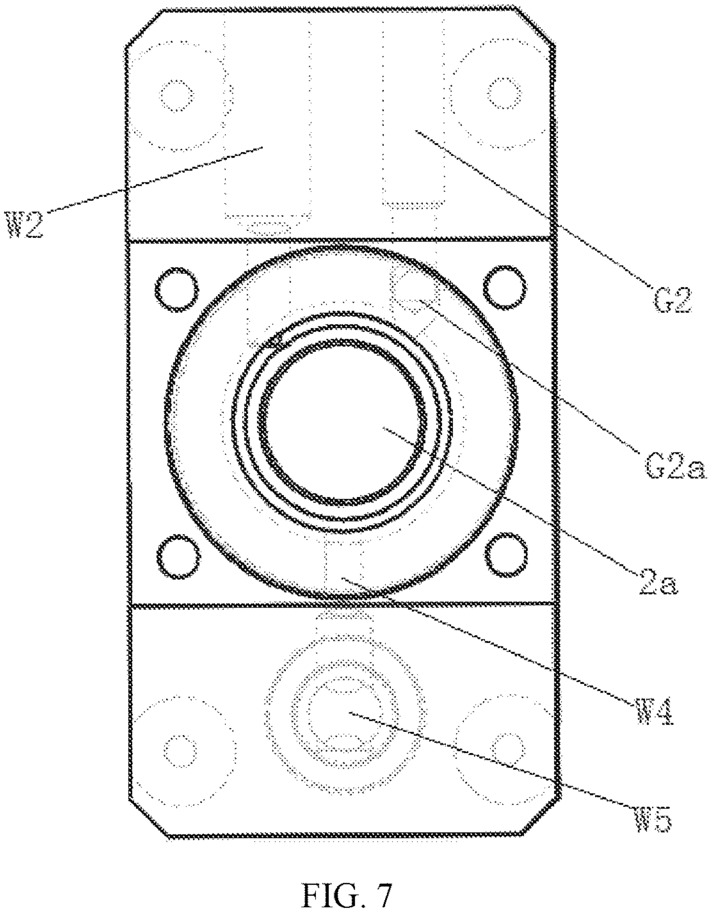
FIG. 7 is a perspective view of the front gun body according to the present invention.
Figure 8:
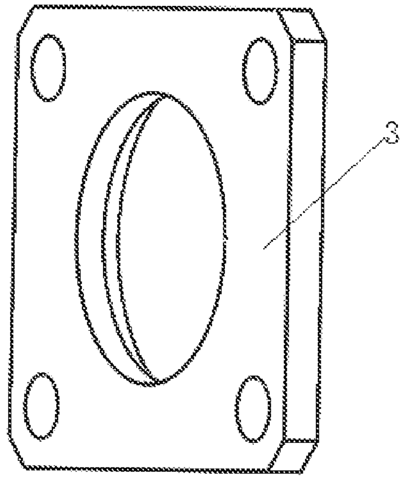
FIG. 8 is a schematic structural diagram of a nozzle gland according to the present invention.

As shown in FIG. 7, an air inlet channel G2 is arranged in the front gun body 2, one end of the air inlet channel G2 is connected to an air inlet pipe G1, and the other end of the air inlet channel is communicated with the annular cavity 1*b* through an inclined air inlet hole G2*a* arranged in the front gun body 2.

The plasma spraying gun further comprises a cooling channel with an interior introduced with cooling water, so that the cooling water enters through the front gun body 2, flows through an outside area of the nozzle 1 and an outside area of the cathode 6 in a surrounding manner in sequence, and then flows out from the rear gun body 5. An outside of the cathode 6 is provided with an annular radiating fin 63 at the corresponding cooling channel. The arrangement of the annular radiating fin 63 is conductive to heat dissipation of the cathode, thus improving ablation resistance of the cathode and prolonging a service life of the cathode, so that the cathode is capable of bearing higher power.

Figure 18:
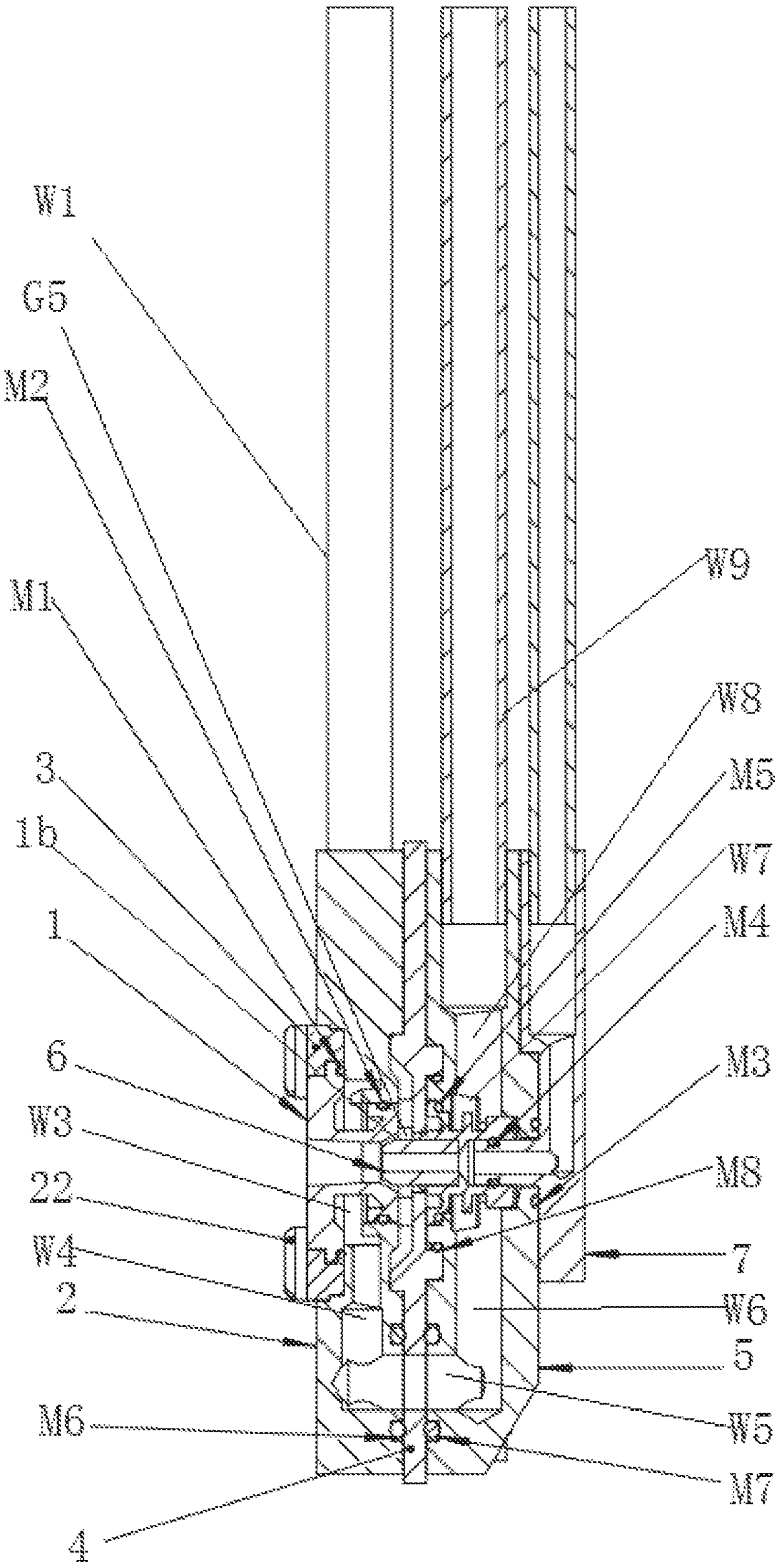
FIG. 18 is a sectional view of B-B in FIG. 15.
Figure 19:
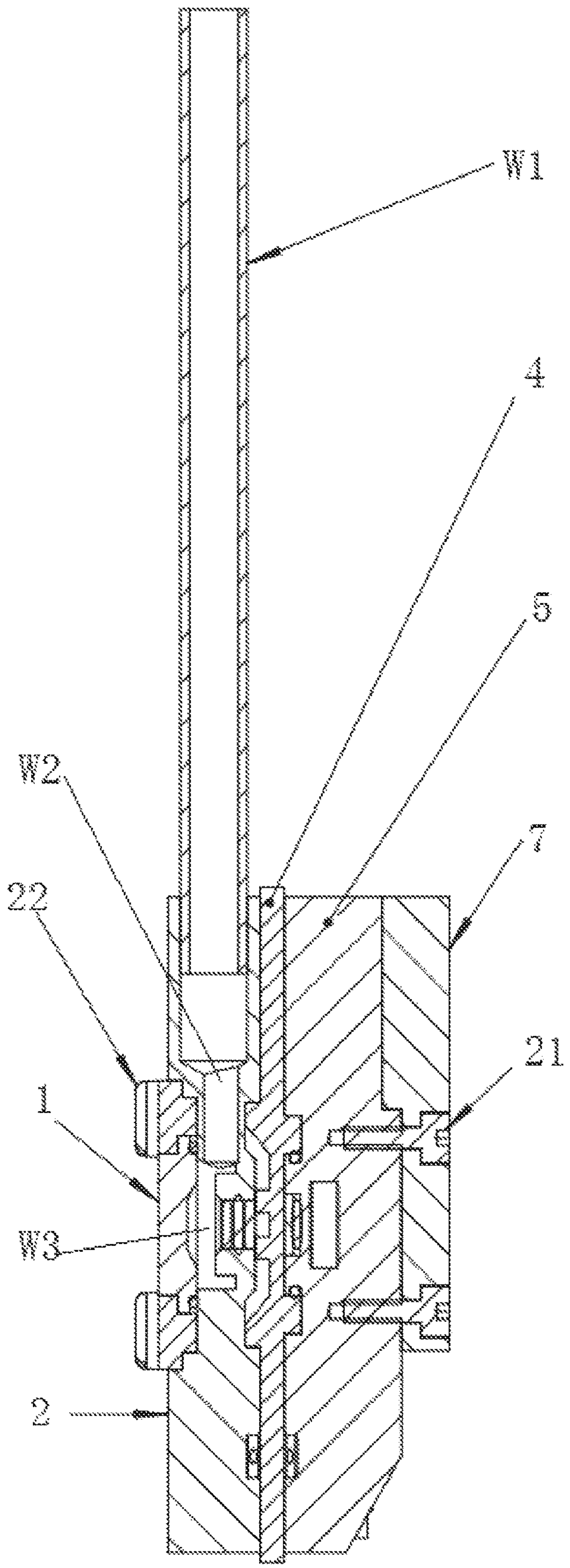
FIG. 19 is a sectional view of C-C in FIG. 15.

As shown in FIG. 18 to FIG. 19, in the embodiment, the cooling channel comprises a water inlet channel W2, a first annular water cavity W3, a water passing channel, a second annular water cavity W7 and a water outlet channel W8 which are communicated in sequence.

The water inlet channel W2 is formed in the front gun body 2, an upper end of the water inlet channel is connected to the water inlet pipe W1, and a lower end of the water inlet channel is connected to the first annular water cavity W3. The first annular water cavity W3 is arranged in the front gun body 2 and arranged around an outer wall of the nozzle 1. In the embodiment, the first annular water cavity W3 is formed by enclosing a groove formed at a periphery of the first through hole 2*a* and the outer wall of the nozzle 1. The first annular water cavity W3 is arranged corresponding to middle and rear portions of the nozzle 1, the outer wall of the nozzle 1 is coaxially provided with an annular cooling groove 1*c*, and an opening of the cooling groove 1*c* faces an outlet end of the nozzle 1 and is communicated with the first annular water cavity W3. The arrangement of the cooling groove 1*c* on the nozzle 1 can greatly reduce a temperature of a groove area of a rubber ring, thus prolonging a service life of the rubber ring, and ensuring high-power operation of the spraying gun.

The water passing channel consists of a water outlet channel W4 of the front gun body, a water inlet channel W6 of the rear gun body and a connecting channel W5 penetrating through the insulator. The water outlet channel W4 of the front gun body is formed in the front gun body 2 and has an upper end communicated with the first annular water cavity W3, the connecting channel W5 is arranged perpendicular to the insulator 4, and the water inlet channel W6 of the rear gun body is formed in the rear gun body 5. Two ends of the connecting channel W5 are respectively communicated with lower ends of the water outlet channel W4 of the front gun body and the water inlet channel W6 of the rear gun body. The second annular water cavity W7 is arranged in the rear gun body 5, and the annular radiating fin 63 is located in the second annular water cavity W7. An upper end of the water inlet channel W6 of the rear gun body is communicated with the second annular water cavity W7. The water outlet channel W8 is formed in the rear gun body 2, an upper end of the water outlet channel W8 is connected to a water outlet pipe W9, and a lower end of the water outlet channel is communicated with the second annular water cavity W7.

An O-shaped ring M6 is arranged between the front gun body 2 and the insulator 4, and an O-shaped ring M7 and the O-shaped ring M6 are arranged between the rear gun body 5 and the insulator 4. The O-shaped ring M6 and the O-shaped ring M7 are both arranged around the connecting channel W5, and the O-shaped ring M6 and the O-shaped ring M7 are symmetrically arranged on two sides of the insulator 4. An O-shaped ring M8 is used for forming sealed connection between the second through hole 4*a* and the third through hole 5*a*.

Figure 9:
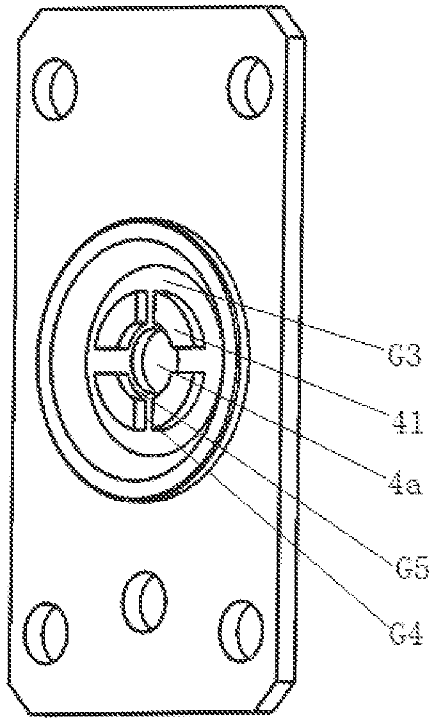
FIG. 9 is a schematic structural diagram of an insulator according to the present invention.
Figure 10:
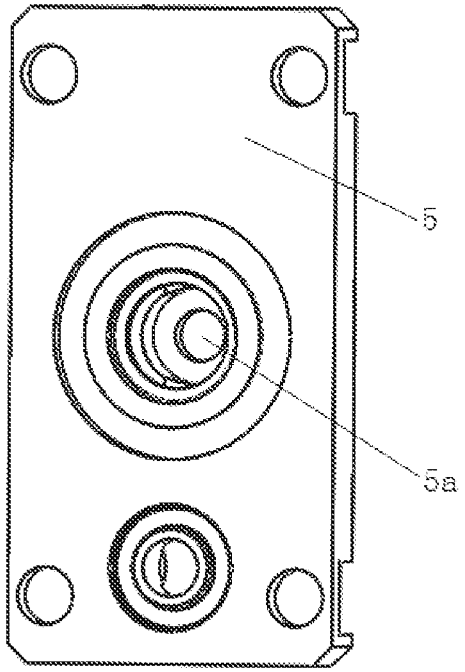
FIG. 10 is a schematic diagram of an external structure of a rear gun body according to the present invention.
Figure 11:
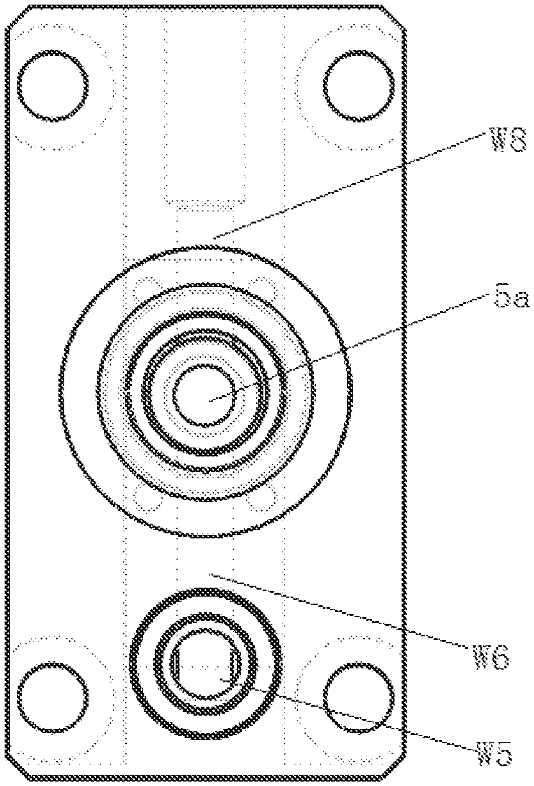
FIG. 11 is a perspective view of the rear gun body according to the present invention.
Figure 12:
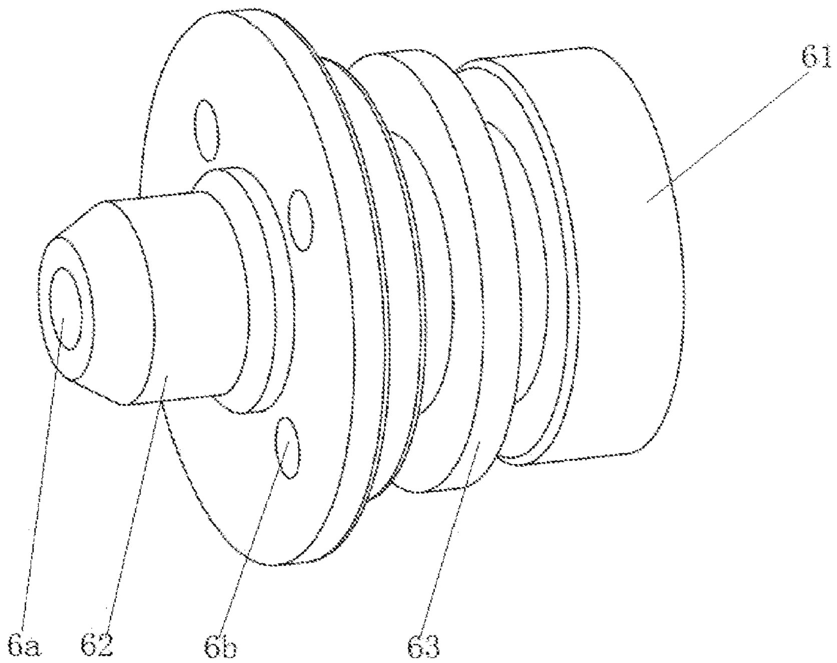
FIG. 12 is a schematic structural diagram of a cathode according to the present invention.
Figure 17:
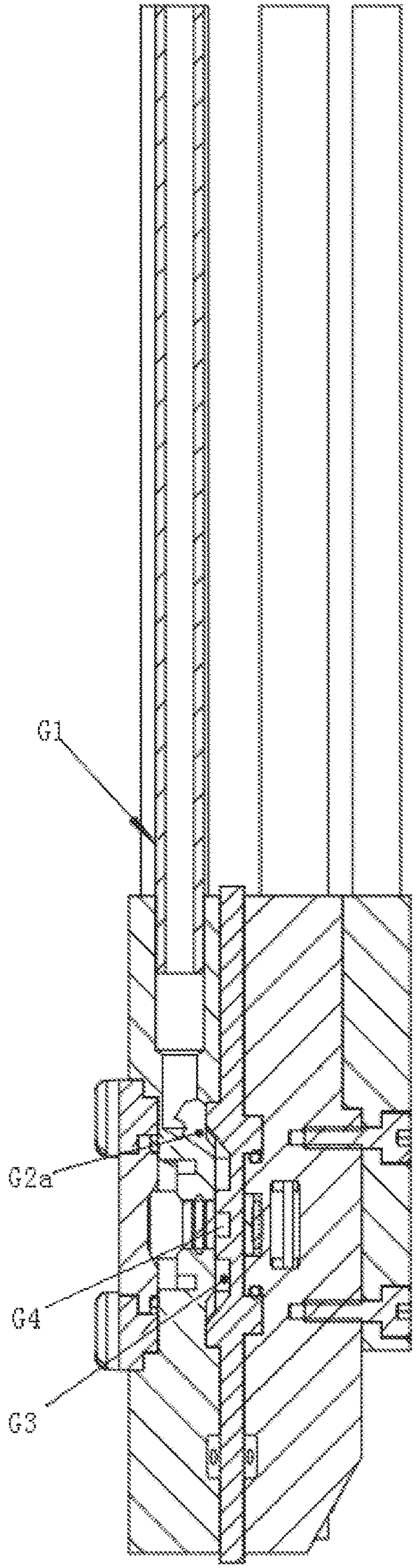
FIG. 17 is a sectional view of A-A in FIG. 15.

Further preferably, as shown in FIG. 9, FIG. 17 and FIG. 18, the insulator 4 is provided with an annular air inlet groove on one side facing the front gun body 2, and the air inlet groove is communicated with the air inlet channel G2 through the inclined air inlet hole G2*a*. The air inlet groove is arranged around the second through hole 4*a* and coaxially arranged with the second through hole 4*a*. An annular bulge 41 is coaxially and fixedly arranged in the air inlet groove, and the bulge 41 divides the air inlet groove into a first annular groove G3 and a second annular groove G5 which are concentrically arranged. The bulge 41 is provided with a plurality of guide air grooves G4, and the guide air grooves G4 communicate the first annular groove G3 with the second annular groove G5. The second annular groove G5 is communicated and coaxially arranged with the annular cavity 1*b*. A back-pressure air chamber is formed at a joint between the second annular groove G5 and the annular cavity 1*b*. The bulge 41 not only plays a role in supporting, but also ensures smooth flowing of an air flow. The guide air grooves G4 can guide the air flow to play a role of air ring, so that the air ring is omitted compared with an existing spraying gun, which is conducive to reducing the thickness of the spraying gun.

In the embodiment, four guide air grooves G4 are provided and uniformly distributed in a circumferential direction of the bulge 41 to divide the bulge 41 into four equal parts in structure. An axis of the air guide groove G4 is arranged in an radial direction of the annular bulge 41, which means that gas is sprayed towards a center of the second annular groove G5 through the air guide grooves G4. The gas is in a non-rotating state when entering the second annular groove G5 (the back pressure air chamber) through the air guide grooves G4. A plasma jet flow formed by a non-rotating air flow has a low velocity, which is suitable for spraying a high-melting-point powder material.

In another embodiment, an included angle of route deviation is formed between an axial direction of the guide air grooves G4 and a radial direction of the annular bulge 41, so that gas entering from the guide air grooves G4 deviates from a center of the second annular groove G5. At the moment, the gas is in a rotating state when entering the second annular groove G5 (the back pressure air chamber) through the air guide grooves G4. A plasma jet flow formed by a rotating air flow has a higher velocity, which is suitable for spraying a low-melting-point powder material. The included angle of deviation may be set as 30° maximumly.

Figure 20:
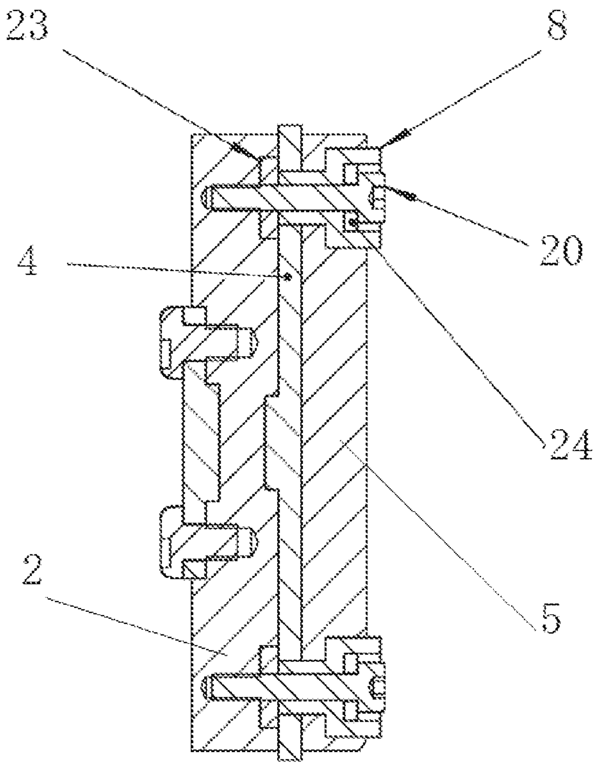
FIG. 20 is a sectional view of D-D in FIG. 15.
Figure 21:
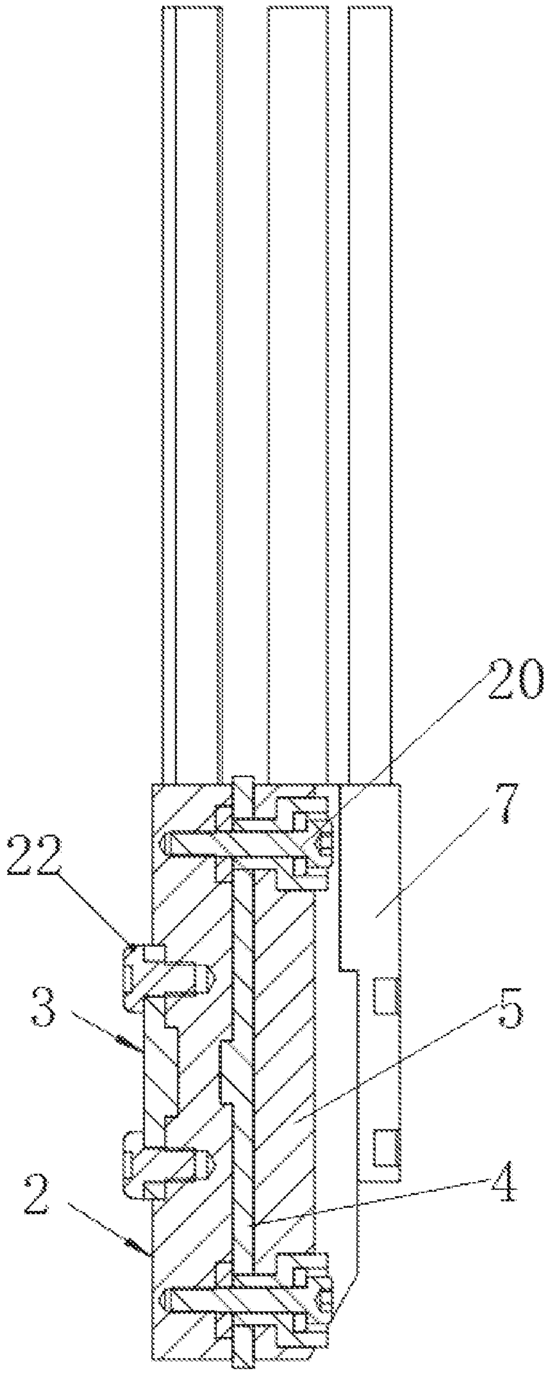
FIG. 21 is a sectional view of E-E in FIG. 15.

As shown in FIG. 20, in the embodiment, the insulator 4 is connected with the front gun body 2 and the rear gun body 5 at the same time through a gun body fixing bolt 20. The gun body fixing bolt 20 is inserted from the rear gun body 5 (towards the front gun body 2). An insulating gasket 23 is embedded in the front gun body 2, and the insulating gasket 23 is sleeved on a screw of the gun body fixing bolt 20 and abuts against the insulator 4. An insulating bushing 8 is embedded in the rear gun body 5 and the insulator 4 at the same time, and the insulating bushing 8 is sleeved on the screw and a nut of the gun body fixing bolt 20 at the same time. Moreover, one end of the insulating bushing 8 abuts against the insulating gasket 23, and an insulating gasket 24 is mounted between a bottom portion of the nut of the gun body fixing bolt 20 and the insulating bushing 8.

The front gun body 2 and the rear gun body 5 are insulated by using the insulating gasket 23 and the screw insulating bushing 8 at a joint of the spraying gun fixing bolt 20. There is no straight-through gap between the front gun body 2 and the rear gun body 5 at a connected area of the spraying gun fixing bolt 20 after mounting, and all seams or gaps are labyrinth-type In arc ignition or plasma spraying work, an electric arc will not be ignited in the connected area of the spraying gun fixing bolt 20 due to a slit effect to cause a burning loss of the spraying gun. A short-circuit burning loss in a connected area of a spraying gun fixing bolt of an existing inner hole spraying gun is a common damage form. According to the present invention, there is good insulation between the front gun body 2 and the rear gun body 5, which can effectively avoid accidental short-circuit ablation in the area.

In the embodiment, a space size of the spraying gun in an axial direction is saved by adopting designs of the gland-type fixed nozzle, the air groove of the insulator, the axial powder feeding and the labyrinth-type gap in the connected area of the spraying gun fixing bolt 20, so that a minimum thickness of the spraying gun is 28 mm. The small-thickness spraying gun provides a premise for spraying the small-size inner hole.

According to the small-size axial powder feeding inner hole plasma spraying gun provided by the present invention, sizes of parts of the spraying gun may be determined according to the following formula to obtain a better spraying effect:

$$m = \left(\frac{d_0 \cdot T_0}{1000}\right)^3 \cdot \rho_0^2;$$

wherein m is a reference value for selection, do is a particle size of powder (mm), $T_0$ is a melting point of a powder material (° C.), and $\rho_0$ is a density of the powder material (g/cm$^3$). A value of $d_0$ ranges from 0.01 mm to 0.1 mm.

In practical application, specifications and models of several nozzles may be determined in advance, and then the model of the nozzle is quickly selected by calculating the reference value m for selection according to a melting point, a particle size and a density of a material to be sprayed, so as to improve an optimization efficiency of spraying process, and prevent the powder material from being melted and adhered to the inner wall of the hole channel of the nozzle when the nozzle is mistakenly selected to affect a jet flow quality and a coating quality. When the nozzle is mistakenly selected, the nozzle and the spraying gun may even be burnt due to blockage of the hole channel. A specific method for selecting the model is shown in Table 1.

TABLE 1

Model selection table of nozzle and cathode, and key size parameters.

| Model | Diameter of throat d1 (mm) | Diameter of outlet of nozzle d2 (mm) | Length of cathode head Lw (mm) | Reference value for selection m |
|---|---|---|---|---|
| 1 | 5 | 4 | 3.5 | >100 |
| 2 | 5.2 | 4.4 | 3.8 | 30-100 |
| 3 | 6.4 | 4.8 | 5.2 | 5-30 |
| 4 | 7 | 5 | 5.8 | 0.5-5 |
| 5 | 7.5 | 5.4 | 6.5 | <0.5 |

Preferably, the nozzle 1 is made of chromium zircomium copper alloy. The front gun body 2, the rear gun body 5, the powder feeding frame 7, the air inlet pipe G1, the water inlet pipe W1 and the water outlet pipe W9 are all made of brass alloy. The cathode head 62 is made of tungsten alloy. The cathode seat 61 is made of red copper or brass alloy. The nozzle gland 3 is made of stainless steel. The insulator 4, the insulating bushing 8, the insulating gasket 23 and the insulating gasket 24 are made of a resin material, which may be polyimide resin, phenolic resin, bismaleimide resin and other resins.

According to the small-size axial powder feeding inner hole plasma spraying gun provided by the present invention, the gun body thickness of the spraying gun may be controlled to range from 28 mm to 32 mm. A minimum diameter of a sprayable inner hole is 55 mm, and a maximum diameter of the sprayable inner hole is unlimited. The design of axial powder feeding, the small-thickness inner hole gun and the high power ensure the preparation of a high-performance coating in the small-size inner hole under a small spraying distance.

In the present invention, a high-pressure gas mode is used, wherein a maximum pressure of argon is 1.2 MPa, a maximum pressure of hydrogen is 1.0 MPa, and a maximum pressure of nitrogen is 1.0 MPa. Moreover, the nozzle has a De-Laval structure of small hole channel, so that the nozzle has a higher cooling efficiency. Therefore, a compression effect of a plasma arc is improved. Therefore, a maximum working voltage can reach 100 V, the plasma jet flow has a better stability, the plasma arc has a better rigidity, and the jet flow has a higher velocity.

Maximum power of the spraying gun is 40 kW, and corresponding electrical parameters comprise a current of 400 A and a voltage of 100 V; or a current of 450 A and a voltage of 90 V. Interiors of the front gun body 2 and the rear gun body 5 both adopt the design of maximum-diameter water channel, a water flow channel in an interior of the spraying gun is simple without complicated cooling holes, and a water flow flows smoothly in the interior of the spraying gun and has low pressure drop. The cooling water cools exteriors of the throat of the nozzle and the expansion section of the hole channel which have the highest temperature and are most prone to the burning loss in the spraying gun first. A rear portion of the cathode 6 is provided with the radiating fin, which can greatly improve a heat dissipation effect of the cathode 6. The nozzle 1 is provided with the cooling groove 1*c*, which can greatly reduce the temperature in the groove area of the rubber ring, and the arrangement of the structure above ensures improvement of power of the spraying gun.

A working process of the small-size axial powder feeding inner hole plasma spraying gun provided by the present invention is as follows: the cooling water enters the interior of the spraying gun from the water inlet pipe and flows out from the water outlet pipe to cool the spraying gun, and meanwhile, the water inlet pipe is connected to a positive pole of a power supply, and the water outlet pipe is connected to a negative pole of the power supply. Plasma working gas (generally comprising a mixed gas of argon and hydrogen, or a mixed gas of argon and nitrogen) enters the interior of the spraying gun from the air inlet pipe, enters the nozzle 1 from the annular cavity 1*b*, and is sprayed out from the outlet of the nozzle 1. After the spraying gun is powered on, the working gas in an interior of the nozzle becomes the plasma jet flow after high-frequency arc ignition. A gas-powder mixture enters the plasma jet flow in the nozzle. After the plasma jet flow is heated and sprayed on a surface of a workpiece at an accelerated velocity, the powder is cooled to form the coating.

A working principle of the interior of the spraying gun is as follows.

Water route: as shown in FIG. 18, the cooling water enters the first annular water cavity (a cooling cavity of the nozzle) W3 from the water inlet pipe W1 through the water inlet channel W2 of the front gun body, after cooling the nozzle 1, the cooling water passes through the water outlet channel W4 of the front gun body, the connecting channel W5 and the water inlet channel W6 of the rear gun body in sequence, enters the second annular water cavity (a cooling cavity of the cathode) W7 to cool the cathode 6, and finally flows out of the spraying gun through the water outlet channel W8 and the water outlet pipe W9.

Gas route: as shown in FIG. 17 to FIG. 18, the working gas (generally composed of argon+hydrogen or argon+nitrogen) enters the front gun body from the air inlet pipe G1, then passes through the air inlet channel G2, the inclined air inlet hole G2*a*, the first annular groove G3 and the guide air grooves G4 in sequence, enters the back pressure air chamber composed of the second annular groove G5 and the annular cavity 1*b*, and finally is sprayed out of the spraying gun through the throat of the nozzle and the outlet of the nozzle.

Electric circuit: the water inlet hole is connected to the positive pole of the power supply, and the water outlet hole is connected to the negative pole of the power supply. The nozzle 1, the nozzle gland 3 and the front gun body 2 of the spraying gun form the positive pole. The cathode 6, the powder feeding frame 7 and the rear gun body 5 of the spraying gun form the negative pole. The insulator 4 separates the positive and negative poles to prevent short circuit.

Powder route: the gas-powder mixture enters the powder feeding frame 7 from the powder inlet pipe F1, passes through the powder inlet channel 7*a* in the powder feeding frame 7, the powder feeding joint 71 and the hole channel in the cathode 6, enters the throat of the nozzle 1 to merge with the working gas, and finally is sprayed out from the outlet of the nozzle 1.

Although the implementation of the present invention has been disclosed above, it is not limited to the applications listed in the specification and the embodiments, and can be fully applied to various fields suitable for the present invention, and additional modifications can be easily implemented by those skilled in the art. Therefore, the present invention is not limited to the specific details and illustrations shown and described herein without departing from the general concept defined by the claims and the equivalent scope.

The invention claimed is:

1. A small-size axial powder feeding inner hole plasma spraying gun, comprising:

a front gun body provided with a first through hole;

a nozzle with one end fixed on one side of the front gun body through a nozzle gland and the other end penetrating through the first hole to extend to the other side of the front gun body, wherein a spray hole channel is coaxially arranged in the nozzle;

a rear gun body;

an insulator arranged between the front gun body and the rear gun body, and fixedly connected to both the front gun body and the rear gun body, wherein the insulator is provided with a second through hole, and the rear gun body is provided with a third through hole; and the first through hole, the second through hole and the third through hole are coaxially arranged;

a powder feeding frame fixedly connected to the rear gun body, wherein an interior of the powder feeding frame is provided with a powder inlet channel, and one side of the powder feeding frame close to the rear gun body is provided with a powder feeding joint;

and the powder inlet channel is communicated with a channel of the powder feeding joint;

a cathode the second through hole and the third through hole, wherein a cathode seat of the cathode is connected to the powder feeding joint, a cathode head penetrates through the second through hole to extend into the spray hole channel of the nozzle, and an annular cavity is formed between the cathode head and an inner wall of the spray hole channel; and a powder feeding hole channel is coaxially arranged in the cathode, one end of the powder feeding hole channel is communicated with the channel of the powder feeding joint, and the other end of the powder feeding hole channel is communicated with the spray hole channel; and the powder feeding hole channel is coaxially arranged with the spray hole channel;

an air inlet channel arranged on the front gun body and communicated with the annular cavity; and a cooling channel with an interior introduced with cooling water, and is configured to guide the cooling water along a path that passes through the front gun body, through an outside area of the nozzle and an outside area of the cathode in a surrounding manner, and then through the rear gun body, wherein an outside of the cathode is provided with an annular radiating fin at the corresponding cooling channel, wherein the cooling channel comprises a water inlet channel, a first annular water cavity, a water passing channel, a second annular water cavity and a water outlet channel which are communicated in sequence;

the water inlet channel is arranged in the front gun body;

the first annular water cavity is arranged in the front gun body and arranged around an outer wall of the nozzle;

the second annular water cavity is arranged in the rear gun body, and the annular radiating fin is located in the second annular water cavity;

the water passing channel penetrates through the insulator to communicate the first annular water cavity with the second annular water cavity; and the water outlet channel is arranged in the rear gun body.

2. The small-size axial powder feeding inner hole plasma spraying gun according to claim 1, wherein the spray hole channel comprises a compression section, a throat and an expansion section in sequence in an axial direction; and a tail end of the expansion section is an outlet of the nozzle; and the annular cavity is formed between the cathode head and an inner wall of the compression section.

3. The small-size axial powder feeding inner hole plasma spraying gun according to claim 2, wherein an outer wall of the nozzle is coaxially provided with an annular cooling groove, and an opening of the cooling groove faces an outlet end of the nozzle and is communicated with the first annular water cavity.

4. The small-size axial powder feeding inner hole plasma spraying gun according to claim 3, wherein the insulator is provided with an annular air inlet groove on one side facing the front gun body, and the air inlet groove is communicated with the air inlet channel and arranged around the second through hole;

an annular bulge is coaxially and fixedly arranged in the air inlet groove, and the bulge divides the air inlet groove into a first annular groove and a second annular groove which are concentrically arranged;

the bulge is provided with a plurality of guide air grooves, and the guide air grooves communicate the first annular groove with the second annular groove; and the second annular groove is communicated with the annular cavity.

5. The small-size axial powder feeding inner hole plasma spraying gun according to claim 4, wherein the air guide grooves are arranged in a radial direction of the annular bulge.

6. The small-size axial powder feeding inner hole plasma spraying gun according to claim 5, wherein an included angle is formed between an axial direction of the guide air grooves and a radial direction of the annular bulge, so that gas entering from the guide air grooves deviates from a center of the second annular groove.

7. The small-size axial powder feeding inner hole plasma spraying gun according to claim 6, wherein the insulator is connected to both the front gun body and the rear gun body;

an insulating gasket is embedded in the front gun body, and the insulating gasket is sleeved on a screw of the gun body fixing bolt and abuts against the insulator; and an insulating bushing is embedded in the rear gun body and the insulator, and the insulating bushing is sleeved on the screw and a nut of the gun body fixing bolt; and one end of the insulating bushing abuts against the insulating gasket.

8. The small-size axial powder feeding inner hole plasma spraying gun according to claim 6, wherein the insulator is connected to both the front gun body and the rear gun body through a gun body fixing bolt;

an insulating gasket is embedded in the front gun body, and the insulating gasket is sleeved on a screw of the gun body fixing bolt and abuts against the insulator; and an insulating bushing is embedded in the rear gun body and the insulator, and the insulating bushing is sleeved on the screw and a nut of the gun body fixing bolt; and one end of the insulating bushing abuts against the insulating gasket.

9. The small-size axial powder feeding inner hole plasma spraying gun according to claim 7, wherein a gun body thickness of the spraying gun ranges from 28 mm to 32 mm.

10. The small-size axial powder feeding inner hole plasma spraying gun according to claim 8, further comprising determination of sizes of parts of the spraying gun according to the following formula:

$$m = \left(\frac{d_0 \cdot T_0}{1000}\right)^3 \cdot \rho_0^2;$$

wherein when m is less than 0.5, d1=7.5, d2=4.8 and Lw=6.5;

when m is 0.5 to 5, d1=7, d2=5 and Lw=5.8;

when m is 5 to 30, d1=6.4, d2=4.8 and Lw=5.2;

when m is 30 to 100, d1=5.2, d2=4.4 and Lw=3.8; and when m is greater than 100, d1=5, d2=4 and Lw=3.5;

wherein m is a reference value for selection, do is a particle size of sprayed powder, in unit mm, To is a melting point of a powder material, in unit ° C., $\rho_0$ is a density of the powder material, in unit g/cm$^3$; d1 is a diameter of the throat, d2 is a diameter of the outlet of the nozzle, and Lw is a length of the cathode head.

* * * * *